United States Patent
Kurokawa et al.

(10) Patent No.: US 7,280,693 B2
(45) Date of Patent: Oct. 9, 2007

(54) DOCUMENT INFORMATION INPUT APPARATUS, DOCUMENT INFORMATION INPUT METHOD, DOCUMENT INFORMATION INPUT PROGRAM AND RECORDING MEDIUM

(75) Inventors: Koji Kurokawa, Kawasaki (JP);
Katsuhito Fujimoto, Kawasaki (JP);
Misako Suwa, Kawasaki (JP);
Yoshinobu Hotta, Kawasaki (JP);
Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 879 days.

(21) Appl. No.: 10/602,624

(22) Filed: Jun. 25, 2003

(65) Prior Publication Data
US 2004/0017940 A1  Jan. 29, 2004

(30) Foreign Application Priority Data
Jul. 26, 2002  (JP)  ............................. 2002-217386

(51) Int. Cl.
*G06K 9/00* (2006.01)
(52) U.S. Cl. ...................................... 382/173; 382/317
(58) Field of Classification Search ................ 382/100, 382/173, 176, 317; 358/462, 464; 715/505, 715/507, 508, 531
See application file for complete search history.

(56) References Cited

U.S. PATENT DOCUMENTS 5,313,571 A  5/1994  Hirose et al. ............... 395/140
5,369,508 A * 11/1994  Lech et al. .................. 358/462
2002/0006220 A1 * 1/2002  Kohchi ........................ 382/165
2004/0146198 A1 * 7/2004  Herley ......................... 382/173
2004/0194035 A1 * 9/2004  Chakraborty ............... 715/531

FOREIGN PATENT DOCUMENTS

JP  11-203403 A  7/1999
JP  2000-331117 A  11/2000

OTHER PUBLICATIONS

English Translation of First Notification of Office Action for Patent Application No. 03149814.0, dated Jun. 3, 2005.

* cited by examiner

*Primary Examiner*—Andrew W. Johns
(74) *Attorney, Agent, or Firm*—Staas & Halsey LLP

(57) ABSTRACT

A document information input apparatus detects a position and an attribute of an area of a real document to be input designated by a user with high accuracy. Based on the detected position and attribute, the document information input apparatus recognizes an image of the area as text information by performing recognition processes suitable for the detected attribute such as character recognition, table recognition and a figure process. Then, the document information input apparatus pastes the resulting information to a pertinent position of an electronic document on a display. As a result, it is possible to input information such as a character sequence, a table and a figure from a real document to an electronic document at high speed and with high accuracy.

20 Claims, 13 Drawing Sheets

DOCUMENT INFORMATION INPUT APPARATUS, DOCUMENT INFORMATION INPUT METHOD, DOCUMENT INFORMATION INPUT PROGRAM AND RECORDING MEDIUM

CROSS-REFERENCE TO RELATED APPLICATIONS

The present application is based on Japanese priority application No. 2002-217386 filed Jul. 26, 2002, the entire contents of which are hereby incorporated by reference.

BACKGROUND OF THE INVENTION

1. Field of the Invention

The present invention generally relates to a document information input apparatus, a document information input method, a document information input program and a recording medium that can recognize information in a real document and input the information to another document displayed by a computer.

2. Description of the Related Art

Conventionally, when a user wants to paste a sequence of characters written in a real document to another document on the display of a computer, the user needs to read the real document with a scanner and the like so as to generate image information of the real document. Then, the user causes the computer to recognize the image information as text information. The user copies the character sequence in question in the recognized text information and then pastes the character sequence to the document on the screen of the computer.

Japanese Laid-Open Patent Application No. 11-203403 discloses an information processor. The information processor photographs a document image with a CCD (Charge Coupled Diode) camera at low resolution. Then, when a finger or a pen is photographed together with the document, the information processor takes the difference between the original document image and the document image including the finger or the pen in order to determine a designated local area to be recognized. After that, the information processor newly photographs the designated local area at high resolution and then recognizes image information of the designated local area as text information.

However, the above methods have some problems. The former conventional method has a problem regarding efficiency. In the former conventional method, it takes a long time to perform all the processes from the process for designating and recognizing a portion to be pasted of a real document to the process for pasting the recognized text information to another document on the display, and furthermore, the processes thereof are complicated.

On the other hand, the latter conventional method also has some problems. In the latter conventional method, it is necessary to process a photographed document image in order to determine whether or not a finger or a pen is included in the photographed document image. As a result, the process causes an increased work load. Additionally, it is necessary to detect the position of the finger tip or the pen tip from the document image photographed at low resolution in order to determine the designated local area to be processed. As a result, it is difficult to extract the local area to be recognized with high accuracy because of the small amount of information photographed at low resolution. In order to compensate for this problem, it is necessary to photograph the document image at high resolution as mentioned above. As a result, increased processing time is required.

SUMMARY OF THE INVENTION

It is a general object of the present invention to provide a document information input apparatus, a document information input method and a document information input program in which the above-mentioned problems are eliminated.

A more specific object of the present invention is to provide a document information input apparatus, a document information input method and a document information input program that can input information such as a character sequence, a table and a figure in a real document to another document displayed by a computer at high speed and with high accuracy.

In order to achieve the above-mentioned objects, there is provided according to one aspect of the present invention a document information input method for recognizing information in a real document and inputting the information recognized to a document displayed by a computer, comprising the steps of: designating an area to be processed in the real document; detecting the designated area to be processed; reading an image of the area to be processed; recognizing the image of the area to be processed as text information; and pasting a result of the step of recognizing the image to a pertinent position in the document displayed by the computer.

In the above-mentioned document information input method, the document information input method may further comprise a step of determining which attribute the area to be processed has among a text attribute, a table attribute and a figure attribute when the area to be processed is detected.

In the above-mentioned document information input method, the area to be processed may be determined to have one of the text area attribute, the table attribute and the figure attribute based on the area designated.

In the above-mentioned document information input method, the area to be processed may be determined to have one of the text attribute, the table attribute and the figure attribute based on how the area to be processed is designated.

In the above-mentioned document information input method, the area to be processed, when the area to be processed is determined to have the text attribute, may further have a mode designated, the mode being for recognizing the area to be processed as having text information.

In the above-mentioned document information input method, the area to be processed, when the area to be processed is determined to have the table attribute and a position designated is within a cell, may be detected from an area including the cell and wherein the area to be processed, when the area to be processed is determined to have the table attribute and the position designated is outside any cell, may be detected from an area including a character sequence within a predetermined distance from the position.

According to the above-mentioned inventions, the document information input method detects a position and an attribute of an area to be input designated by a user with high accuracy. Based on the detected position and attribute, the document information input method recognizes an image of the area as text information by performing recognition processes suitable for the detected attribute such as character recognition, table recognition and figure process. Then, the document information input method pastes the resulting information to a pertinent position of an electronic document on the display. As a result, it is possible to realize input information such as a character sequence, a table and a figure from a real document to an electronic document at high speed and with high accuracy.

Other objects, features and advantages of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.

Figure 1:
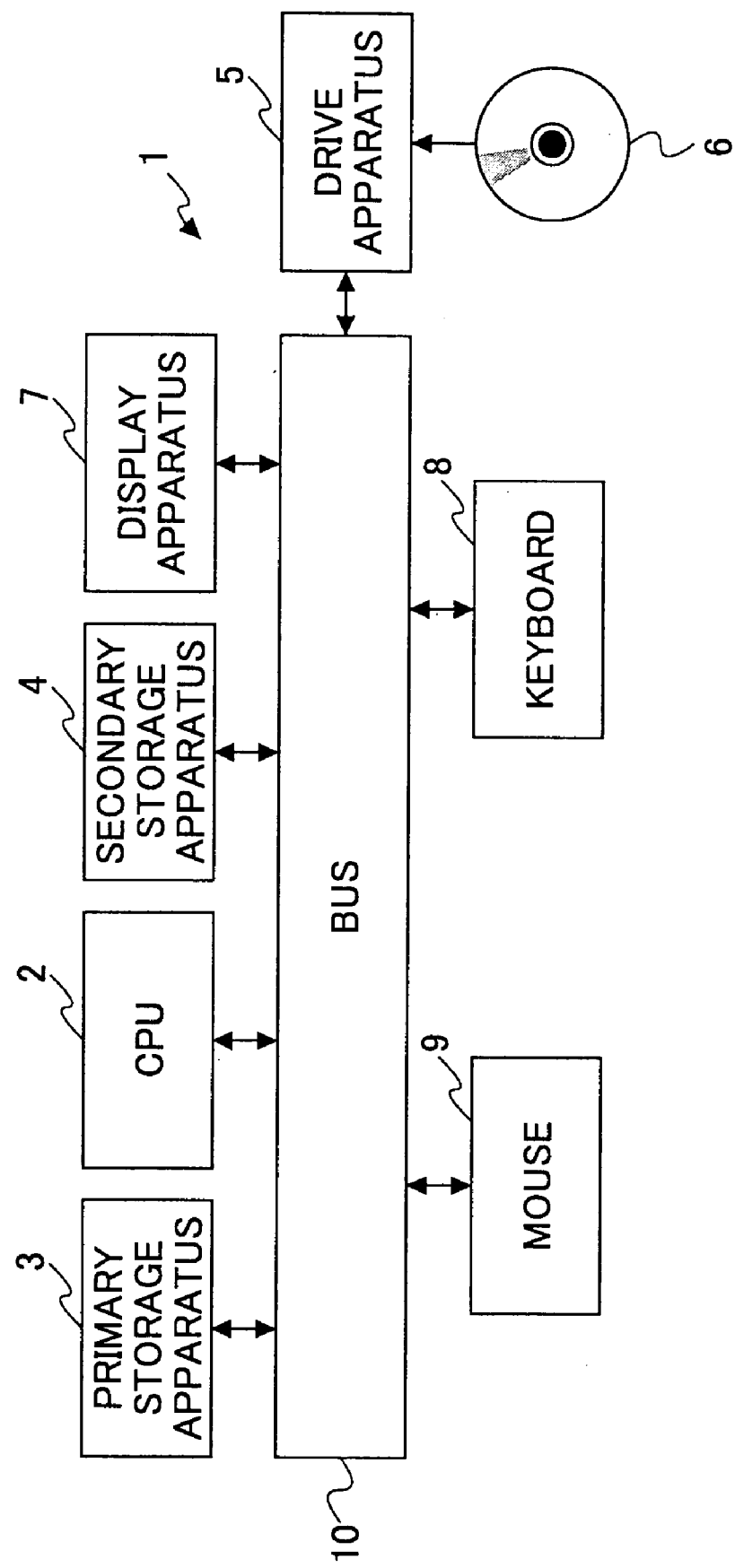
FIG. 1 is a block diagram illustrating a hardware configuration of a computer.

FIG. 1 shows a block diagram of a hardware configuration of a computer 1. As is shown in FIG. 1, the computer 1 comprises a CPU (Central Processing Unit) 2 for processing information, a primary storage apparatus 3 such as a RAM (Random Access Memory) for temporarily storing information during execution by the CPU 2, a secondary storage apparatus 4 such as a HDD (Hard Disk Drive) for storing some data such as a result of the execution, a drive apparatus 5 of a removable medium 6 such as a CD-ROM for storing/distributing information in/to an exterior of the computer 1 and obtaining information from an exterior of the computer 1, a display apparatus 7 for displaying a process and a result of the execution to a user, and an input apparatus such as a keyboard 8 and a mouse 9 through which the user can input an instruction and information. These parts are connected each other via a bus.

Figure 2:
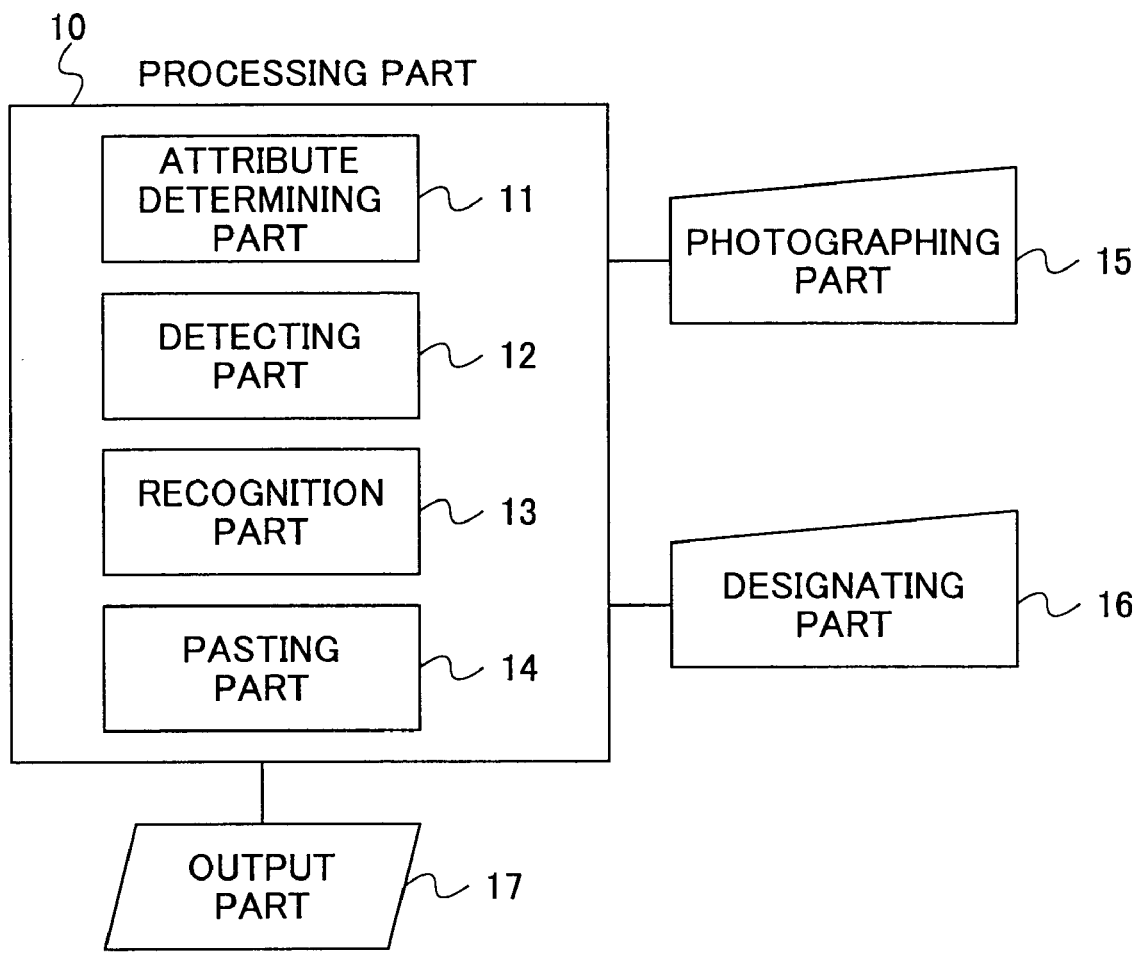
FIG. 2 is a block diagram illustrating a system structure of a document information input apparatus according to a first embodiment of the present invention.

FIG. 2 shows a system structure of a document information input apparatus according to the first embodiment of the present invention.

The document information input apparatus contains a processing part 10, a photographing part 15, a designating part 16, and an output part 17.

The document information input apparatus reads a designated portion of a real document, recognizes an image of the designated portion as text information and pastes the recognized text information to a designated position of an electronic document displayed on the display 7. Here, such a real document is formed as a paper-based document, a car license plate, an advertising sign or the like. Also, it is supposed that the real document contains a character, a table, a figure, a formula and the like. On the other hand, such an electronic document is formed as document information, image information, a spreadsheet or the like.

As is shown in FIG. 2, the processing part 10 comprises an attribute determining part 11, a detecting part 12, a recognition part 13 and a pasting part 14.

The attribute determining part 11 determines an attribute of an area read from a real document. There are typically a text attribute, a table attribute and a figure attribute.

The detecting part 12 detects an area in the real document from which text information is recognized.

The recognition part 13 recognizes text information from an image of the detected area in accordance with the determined attribute.

The pasting part 14 pastes the recognized text information to a designated position in an electronic document on the display apparatus 7 of the computer 1.

Here, the document information input apparatus can perform the above-mentioned procedures in accordance with a program. Such a program may be stored in the secondary storage apparatus 4. When the CPU executes the program, the program is read from the secondary storage apparatus 4 to the primary storage apparatus 3 according to the necessity. Also, the program may be stored in the recording medium 6 and read to the primary storage apparatus 3 or the secondary storage apparatus 4 through the drive apparatus 5.

The photographing part 15 reads an image of the real document. For instance, the photographing part 15 may be a digital still camera or a scanner.

The designating part 16 designates a portion of the real document to be input to the electronic document on the display 7. For instance, the designating part 16 may be an electronic pen and the like.

The output part 17 is formed of a display apparatus, a printer and the like.

Figure 3:
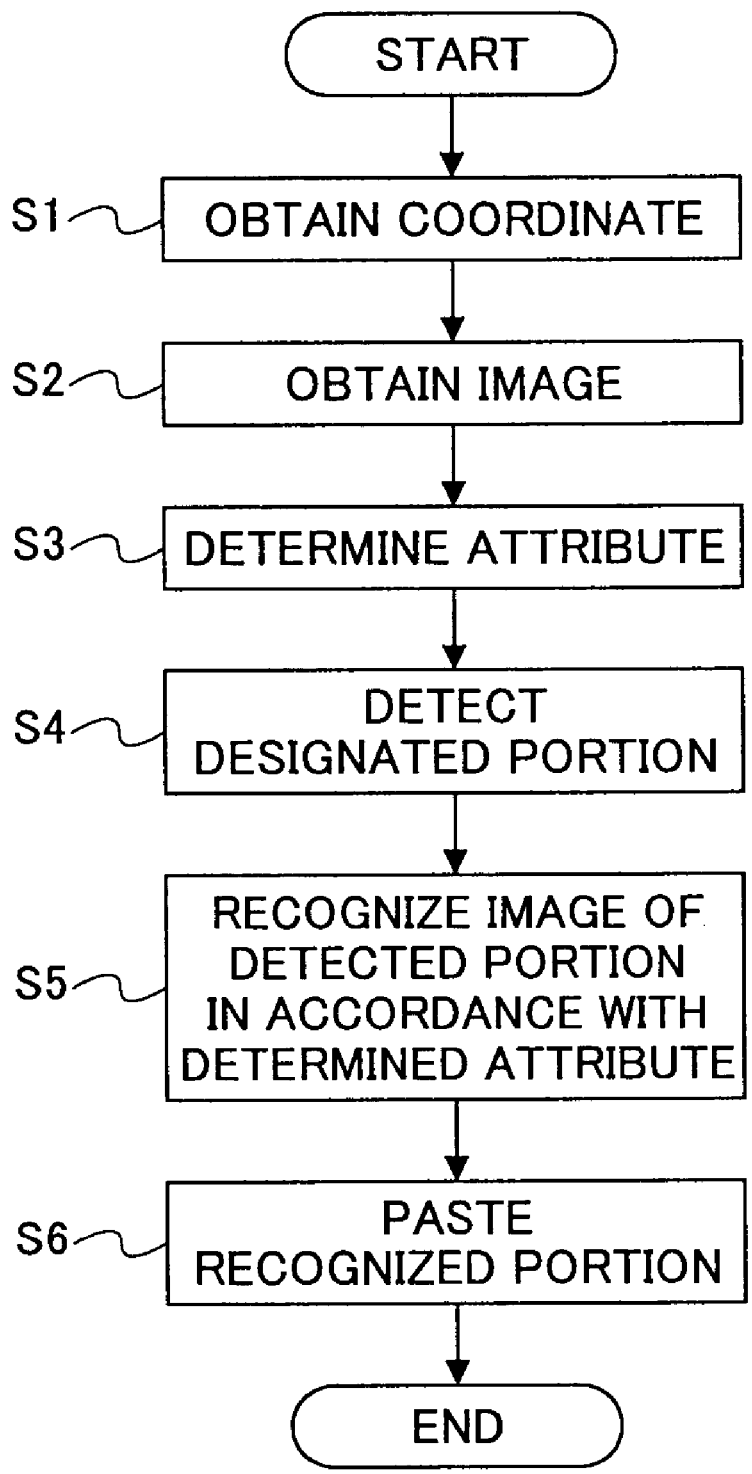
FIG. 3 is a flowchart of a procedure performed by the document information input apparatus according to the first embodiment.

FIG. 3 shows a flowchart of a procedure performed by the document information input apparatus according to the first embodiment.

A user uses the designating part 16 to designate coordinates for defining a portion of a real document that the user wants to paste to an electronic document on the display apparatus 7.

Figure 4:
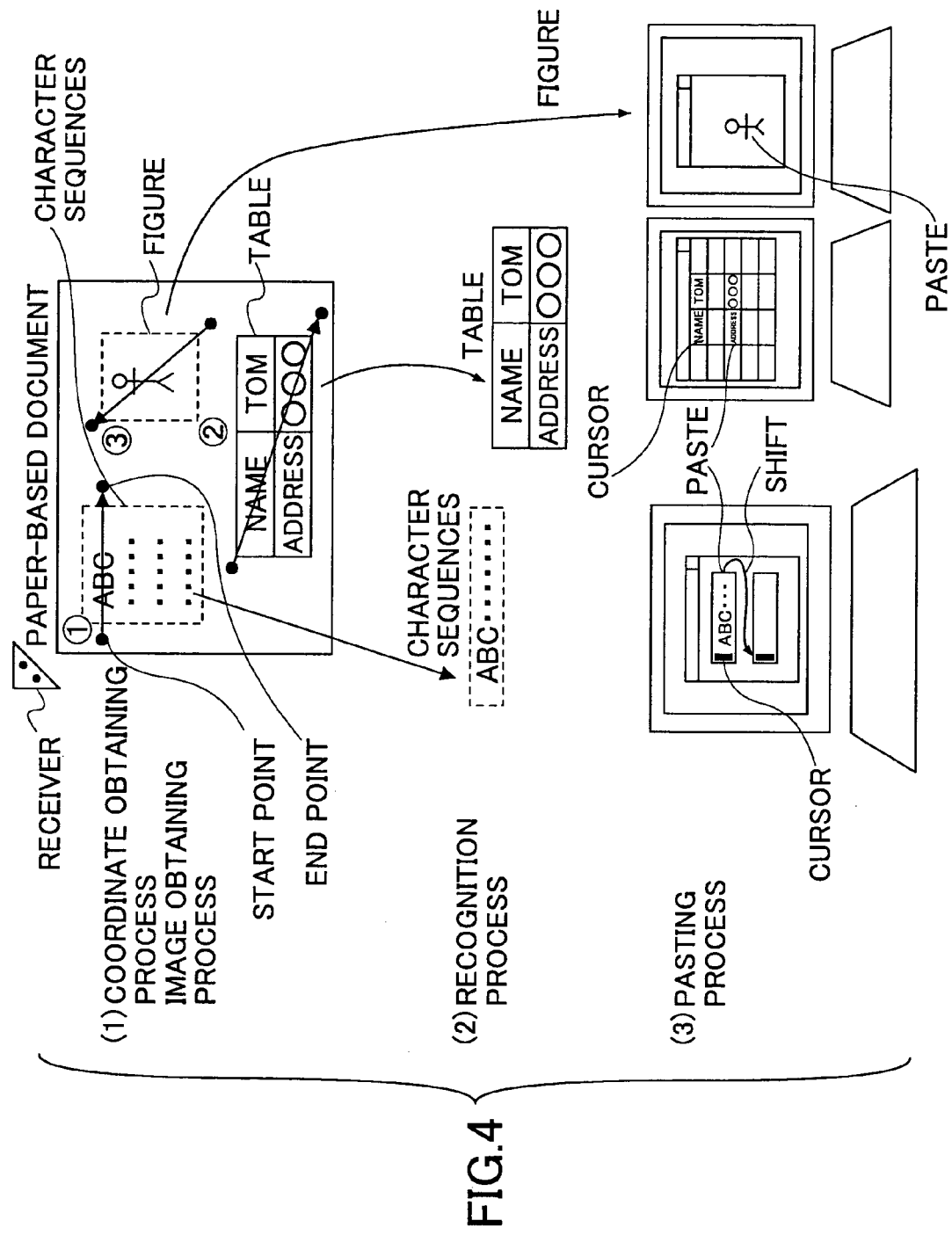
FIG. 4 is a diagram for explaining the procedure performed by the document information input apparatus according to the first embodiment.

At step S1, the document information input apparatus obtains the coordinate information. For instance, if the user designates the portion by dragging an electronic pen as shown in FIG. 4, that is, if the user designates the portion by switching ON the electronic pen at a start point, dragging the electronic pen and then switching OFF the electronic pen at an end point, the coordinate information may be formed of coordinates of the start point and the end point. In this example, the start point and the end point are detected by a receiver apparatus shown in the upper-left area of the real document in FIG. 4.

An area including the above-mentioned designated portion is photographed by the photographing part 15. At step S2, the document information input apparatus obtains an image of the photographed area.

At step S3, the document information input apparatus determines an attribute of the designated portion. As mentioned later in detail, the document information input apparatus according to the first embodiment determines an attribute based on an area designated by the designating part 16. The document information input apparatus determines the attribute corresponding to a designated area as the attribute of an area to be recognized.

At step S4, the document information input apparatus detects the designated area of a real document. As mentioned above, the designated area is detected based on the start point and the end point of the electronic pen. The detailed description thereof will be provided later.

At step S5, the document information input apparatus recognizes an image of the detected area as text information and the like in accordance with the attribute determined at step S3.

At step S6, the document information input apparatus pastes the recognized information such as text information in a designated area of an electronic document on the display apparatus 7.

First, the document information input apparatus detects a portion of a paper-based document and the attribute thereof. Then, the document information input apparatus recognizes the image of the detected portion as text information in accordance with the determined attribute. Finally, the recognized portion is pasted in the designated area of the electronic document on the display apparatus 7. As a result, it is possible to easily and quickly input a character sequence, a table, a figure and the like in the paper-based document to the designated area of the electronic document. In the following, some detailed description will be given of the procedure performed by the document information input apparatus.

FIG. 4 is a diagram for explaining the procedure performed by the document information input apparatus according to the first embodiment.

As is shown in FIG. 4, the paper-based document has a text area in which some characters are printed, a table area in which a table is printed, and a figure area in which a figure is printed.

A detailed description will now be given of the coordinate obtaining process and the image obtaining process roughly mentioned in FIG. 3.

When the user puts an electronic pen at a position of the paper-based document and then switches ON the electronic pen, the receiver detects the coordinates where the electronic pen is switched ON as a start point. While the user then drags the electronic pen, the receiver is tracing the electronic pen. When the electronic pen is switched OFF, the receiver detects the coordinates where the electric pen is switched OFF as an end point. The document information input apparatus uses a conventional receiver to perform this process.

In this fashion, the document information input apparatus can detect the coordinates of the start point and the end point. Based on the detected coordinates, the document information input apparatus reads a designated portion of the paper-based document by means of a digital still camera, a scanner or the like so as to obtain an image of the portion.

Figure 5:
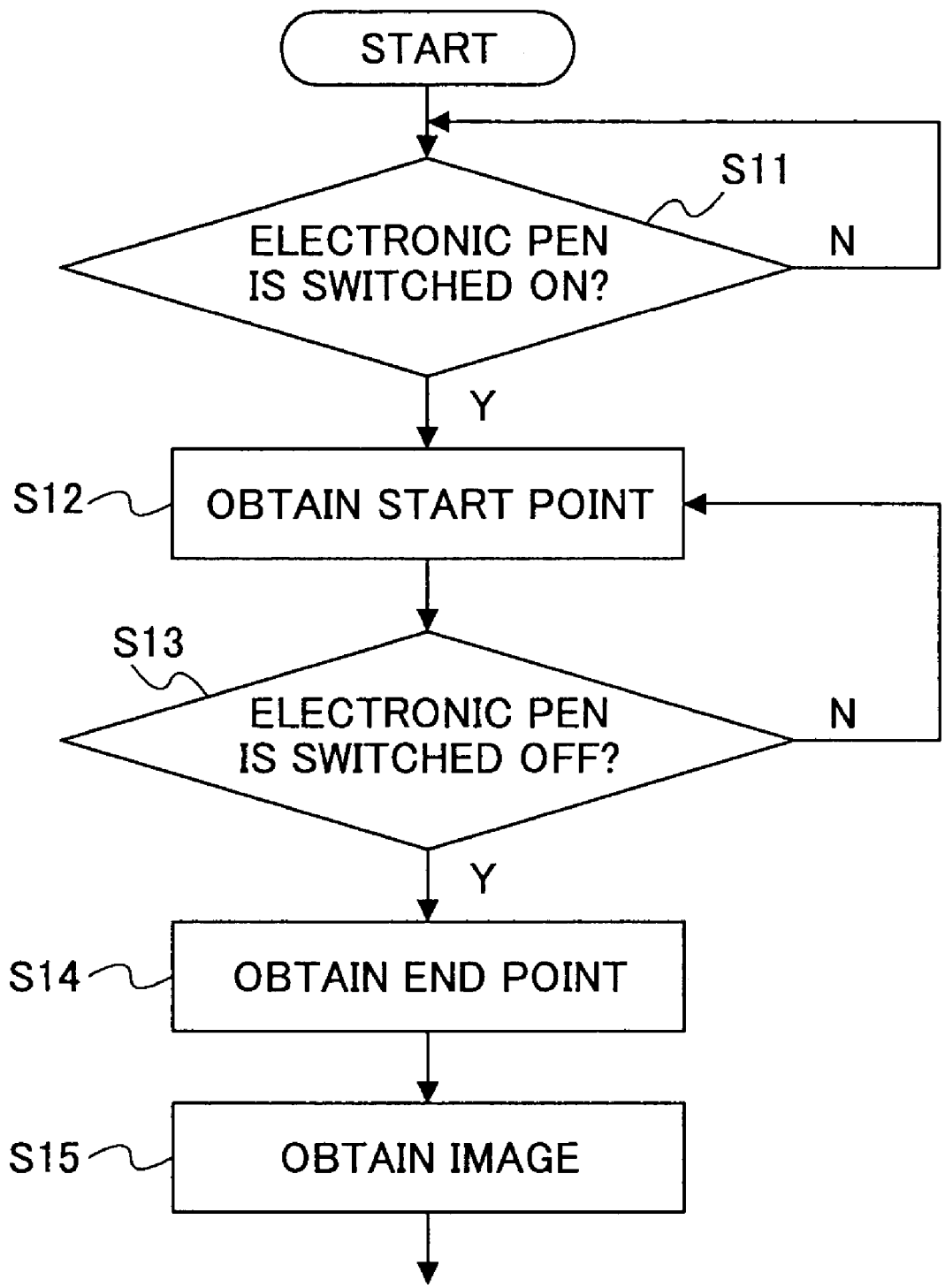
FIG. 5 is a flowchart of a coordinate obtaining process and an image obtaining process performed by the document information input apparatus according to the first embodiment.

FIG. 5 shows a flowchart of the coordinate obtaining process and the image obtaining process. At step S11, the document information input apparatus determines whether or not the electronic pen is switched ON. In the example shown in FIG. 4, the document information input apparatus determines whether or not the user puts and switches ON the electronic pen at a position on the paper-based document. If the electronic pen is determined to be switched ON, the document information input apparatus proceeds to step S12. If the electronic pen is determined not to be switched ON, the document information input apparatus repeats the step S11 until the electronic pen is switched ON.

At step S12, the document information input apparatus obtains the position where the electronic pen is switched ON as the start point.

At step S13, the document information input apparatus determines whether or not the electronic pen is dragged and then switched OFF. If the electronic pen is determined to be dragged and then switched OFF, the document information input apparatus proceeds to step S14. If the electronic pen is determined not to be dragged and then switched OFF, the document information input apparatus repeats the step S13 until the electronic pen is switched OFF.

At step S14, the document information input apparatus obtains the position where the electronic pen is switched OFF as the end point.

At step S15, the document information input apparatus uses the photographing part 15 to obtain an image of an area determined based on the obtained start point and the obtained end point.

As a result, when the document information input apparatus detects the start point and the end point in the paper-based document shown in FIG. 4, the document information input apparatus can use the photographing part 15 to obtain the image information of the rectangular area, which is surrounded by the dot line in FIG. 4, defined by the start point and the end point. Then, the document information input apparatus proceeds to the recognition process.

Next, a detailed description will be given of the recognition process roughly mentioned in FIG. 3. The document information input apparatus recognizes the obtained document image. In this example shown in FIG. 4, the obtained document image contains three forms of information, that is, the text form, the table form and the figure form. Regarding the text area of the paper-based document, the document information input apparatus recognizes an image of the text area as text information. Regarding the table area, the document information input apparatus recognizes individual cells in the table in the table area as text information. Regarding the figure area, the document information input apparatus performs no recognition process for the figure in the figure area.

In this fashion, the text area and the table area in the paper-based document are recognized as text information. Here, the document information input apparatus can perform the recognition process with higher accuracy by using obtained attribute information to be mentioned later in detail.

Finally, a detailed description will now be given of the pasting process mentioned in FIG. 3. The document information input apparatus pastes the processed information to an electronic document on the display apparatus 7. As is shown in FIG. 4, regarding the text area of the paper-based document, the document information input apparatus pastes the recognized text information at a position in the electronic document pointed at by a cursor. Regarding the table area of the paper-based document, the document information input apparatus similarly pastes the recognized text information at a position of the electronic document pointed by the cursor. Regarding the figure area of the paper-based document, the document information input apparatus directly pastes the figure area in the obtained image in the designated area of the electronic document. It is noted that the size of the figure area and a pasted position are designated according to necessity.

In this fashion, it is possible to easily and quickly input some characters in a text area, a character sequence in a table area and a figure in a figure area of a paper-based document to designated positions in an electronic document on the display apparatus 7 with high accuracy.

Figure 6:
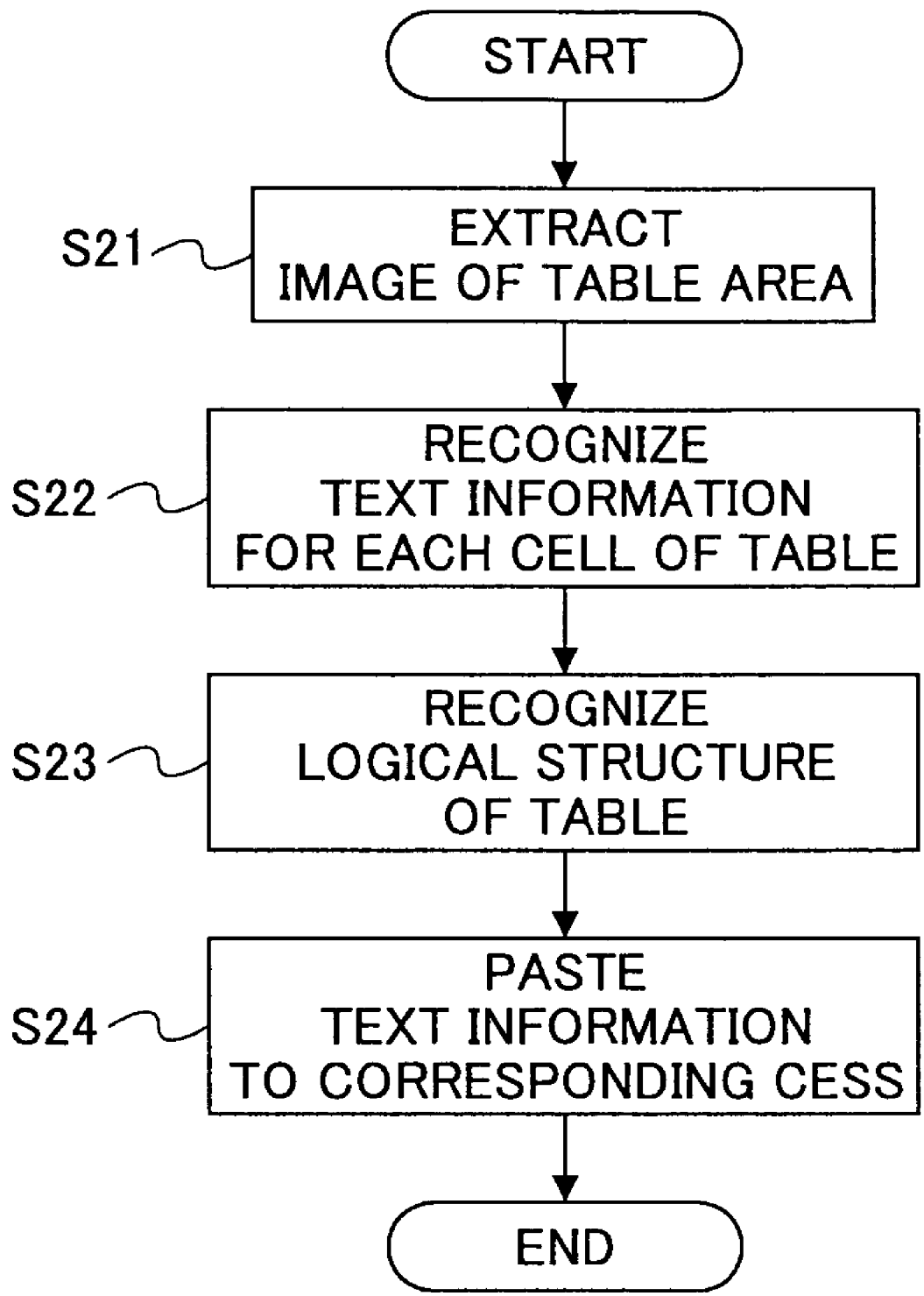
FIG. 6 is a flowchart of a recognition process and a pasting process in a case where a designated area to be recognized is a table area.

FIG. 6 shows a flowchart of the recognition process and the pasting process in a case where the designated area to be recognized is a table area. A detailed description will be given of a character sequence later because the character sequence is recognized by using the attribute information to be mentioned later.

At step S21, the document information input apparatus extracts an image of a table area determined based on the start point and the end point.

At step S22, for each cell of a table in the extracted table area, the document information input apparatus recognizes text information from an image of a character sequence in the cell.

At step S23, the document information input apparatus recognizes a logical structure of the table based on ruled lines in the table. For instance, the logical structure contains information related to the matrix size of the table.

At step S24, as is shown in FIG. 4, the document information input apparatus pastes the text information recognized for each cell in the corresponding cell in the electronic document on the display apparatus 7.

In this fashion, regarding the table area in the paper-based document, the document information input apparatus can quickly recognize the character sequences and the logical structure of the table and then input the recognized character information to the corresponding cell in the electronic document with high accuracy.

Figure 7:
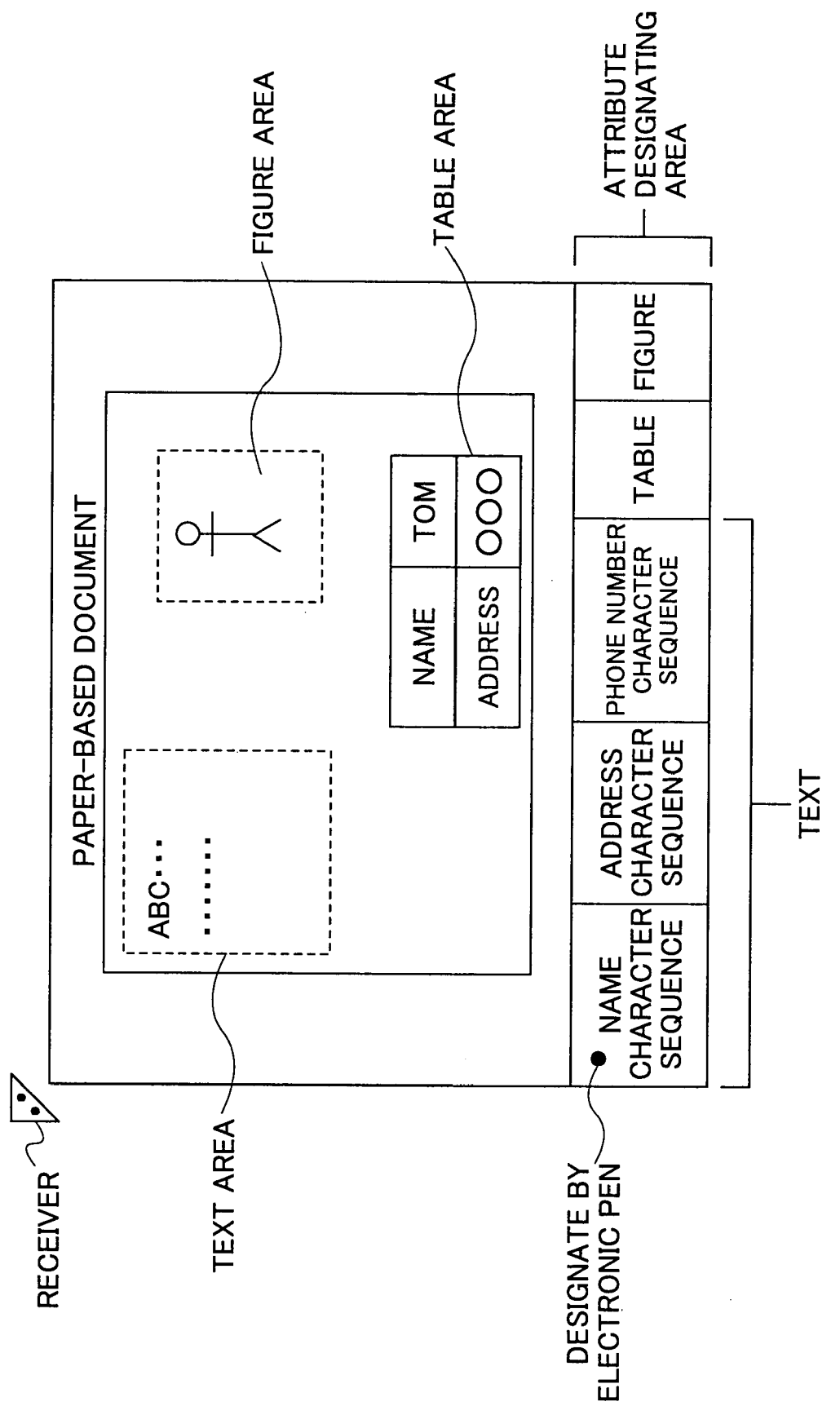
FIG. 7 is a diagram for explaining an attribute determining process performed by the document information input apparatus according to the first embodiment.

FIG. 7 is a diagram for explaining the attribute determining process performed by the document information input apparatus according to the first embodiment.

In an attribute designating area in FIG. 7, an attribute is designated for each of the information areas in the paper-based document in the upper area of FIG. 7. The user designates an attribute for an information area in the paper-based document by clicking the electronic pen on the corresponding attribute area in the attribute designating area. Here, the electronic pen is considered to be clicked on a position if the user switches ON and then switches OFF on the position. After the user designates the attribute, the user drags the electronic pen in order to designate a rectangular area to be recognized. The document information input apparatus recognizes the designated area in accordance with the designated attribute and then pastes the recognized text information in the corresponding position of the electronic document.

As is shown in FIG. 7, the attribute designating area contains the following attributes:
 text:
  name character sequence:
  address character sequence:
  phone number character sequence:
 table:
 figure:

When the user designates one of the name character sequence, the address character sequence and the phone number character sequence by clicking the electronic pen thereon, the document information input apparatus obtains an image of the rectangular area determined by the start point and the end point as mentioned with respect to FIG. 4 and FIG. 5. Based on the designated attribute, the document information input apparatus prepares a name dictionary, an address dictionary and a phone number dictionary in accordance with the name character sequence, the address character sequence and the phone number character sequence, respectively. Furthermore, the document information input apparatus follows an extraction method that is the most suitable for the designated attribute. As a result, the document information input apparatus can recognize an image of the designated character sequence as text information with higher accuracy by using the most suitable dictionary and extraction method.

Also, if the user selects the table attribute for the designated table information, the document information input apparatus starts a recognition engine for properly recognizing the position and the size of each cell of the table by detecting vertical and horizontal ruled lines in the table. Furthermore, the document information input apparatus follows a recognition method that is the most suitable to recognize a character sequence in the table. As a result, the document information input apparatus can recognize the image of the character sequence in each cell in the table as text information with higher accuracy.

Also, if the user selects the figure attribute for the designated figure information, the document information input apparatus performs a scale arrangement and a rotation operation for the designated figure according to necessity. Then, the document information input apparatus pastes the resulting figure to the corresponding position of the electronic document.

As mentioned above, when the user designates an attribute by clicking the electronic pen, the document information input apparatus recognizes the obtained image in accordance with the designated attribute and then pastes the recognized information to the corresponding position of the electronic document. Since the document information input apparatus recognizes the image under the most suitable recognition method for the designated attribute, the document information input apparatus can recognize the image at higher accuracy and input the recognized information to the corresponding position of the electronic document.

Figure 8:
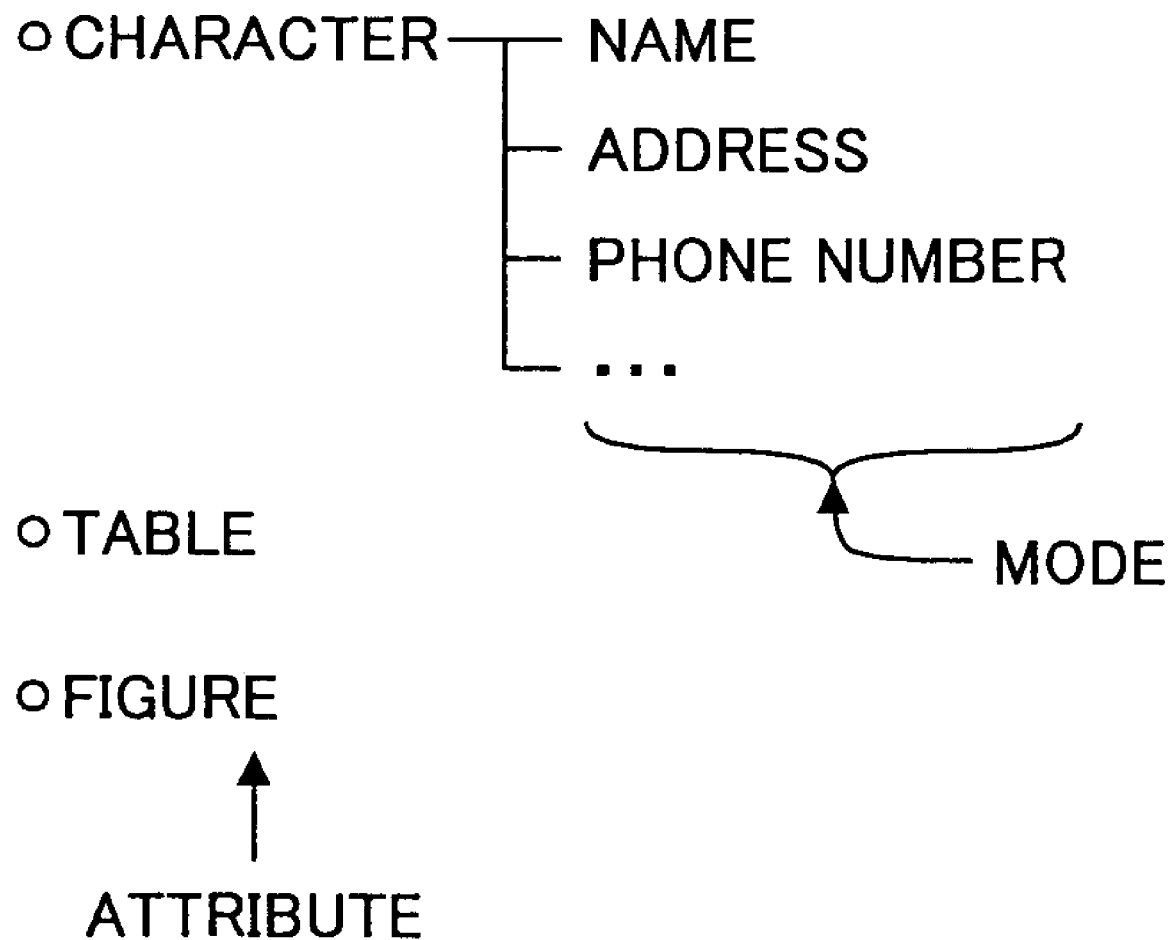
FIG. 8 is a diagram for explaining attributes and modes in detail.

FIG. 8 is a diagram for explaining the attributes and the modes in detail.

As is shown in FIG. 8, the attribute "text" further contains the modes "name", "address", "phone number" and the like. When the user wants to input a character sequence in the paper-based document to the electronic document, the user can further designate such a mode. The document information input apparatus can quickly recognize an image of a designated character sequence as text information with high accuracy by using the most suitable dictionary and extraction method for the designated mode.

Unlike the attribute "text", the attribute "table" does not contain any mode. In the table recognition, the document information input apparatus starts a recognition engine for recognizing a table because the document information input apparatus needs to detect vertical and horizontal ruled lines in order to determine the logical structure of the table such as the size of the table and the matrix information thereof.

Unlike the attribute "text", the attribute "figure" does not contain any mode. In the figure input, the document information input apparatus obtains an image of a designated figure area in a paper-based document. The document information input apparatus starts an engine for changing the scale of the figure and rotating the figure. As a result, the document information input apparatus can change the scale of the figure or rotate the figure according to necessity and then paste the resulting figure in the corresponding position of an electronic document.

Figure 9:
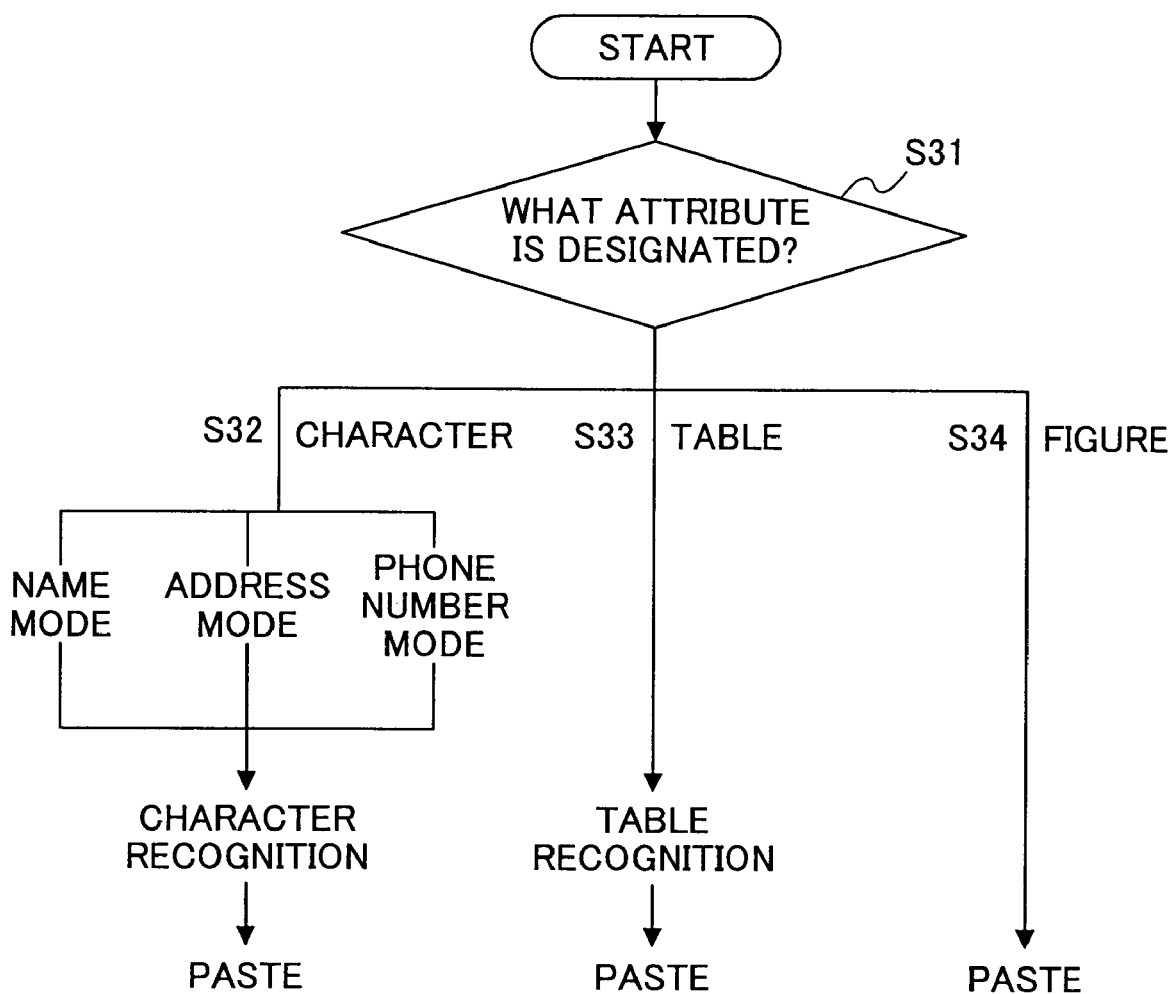
FIG. 9 is a flowchart of an attribute designating process performed by the document information input apparatus according to the first embodiment.

FIG. 9 shows a flowchart of an attribute designating process.

At step S31, the document information input apparatus determines what attribute the user designates. As mentioned above, for instance, the user designates the attribute by clicking the electronic pen on one of the areas in the attribute designating area shown in FIG. 7.

When the user designates one of the name mode, the address mode and the phone number mode in the text attribute at step S31, the document information input apparatus uses a dictionary and an extraction method that are the most suitable for the designated attribute to quickly recognize an obtained image as text information with high accuracy. Then, the document information input apparatus pastes the recognized text information to the position of the electronic document pointed at by the cursor.

At step S33, when the user selects the table attribute at step S31, the document information input apparatus starts a table recognition process that is designed to be the most suitable to recognize a table. Then, the document information input apparatus detects the logical structure of the table and quickly recognizes a character sequence in each cell in the table as text information at high accuracy. The document information input apparatus reproduces the logical structure in the corresponding position of the electronic document and then pastes the recognized text information in the corresponding cell in the reproduced table in the electronic document.

At step S34, when the user selects the figure attribute at step S31, the document information input apparatus starts an engine that is designed to be the most suitable for a figure. Then, the document information input apparatus scales up or down the figure according to necessity and pastes the scaled figure to the corresponding position in the electronic document.

As mentioned above, when the user designates an attribute for an area to be recognized by means of the electronic pen, the document information input apparatus can use the most suitable method for the designated attribute to quickly recognize the image information with high accuracy and input the recognized information to the corresponding position of the electronic document.

In the above-mentioned description, the attribute is divided into the text attribute, the table attribute and the figure attribute. However, the document information input apparatus may prepare other attributes for other types of documents. If a paper-based document contains a special kind of character and notation such as a mathematical formula, such an attribute is provided to the document information input apparatus. Furthermore, a dictionary and an extraction method suitable for the attribute are prepared for the document information input apparatus. As a result, the document information input apparatus can input designated information in an electronic document by extracting and recognizing the information at high speed and with high accuracy.

Figure 10:
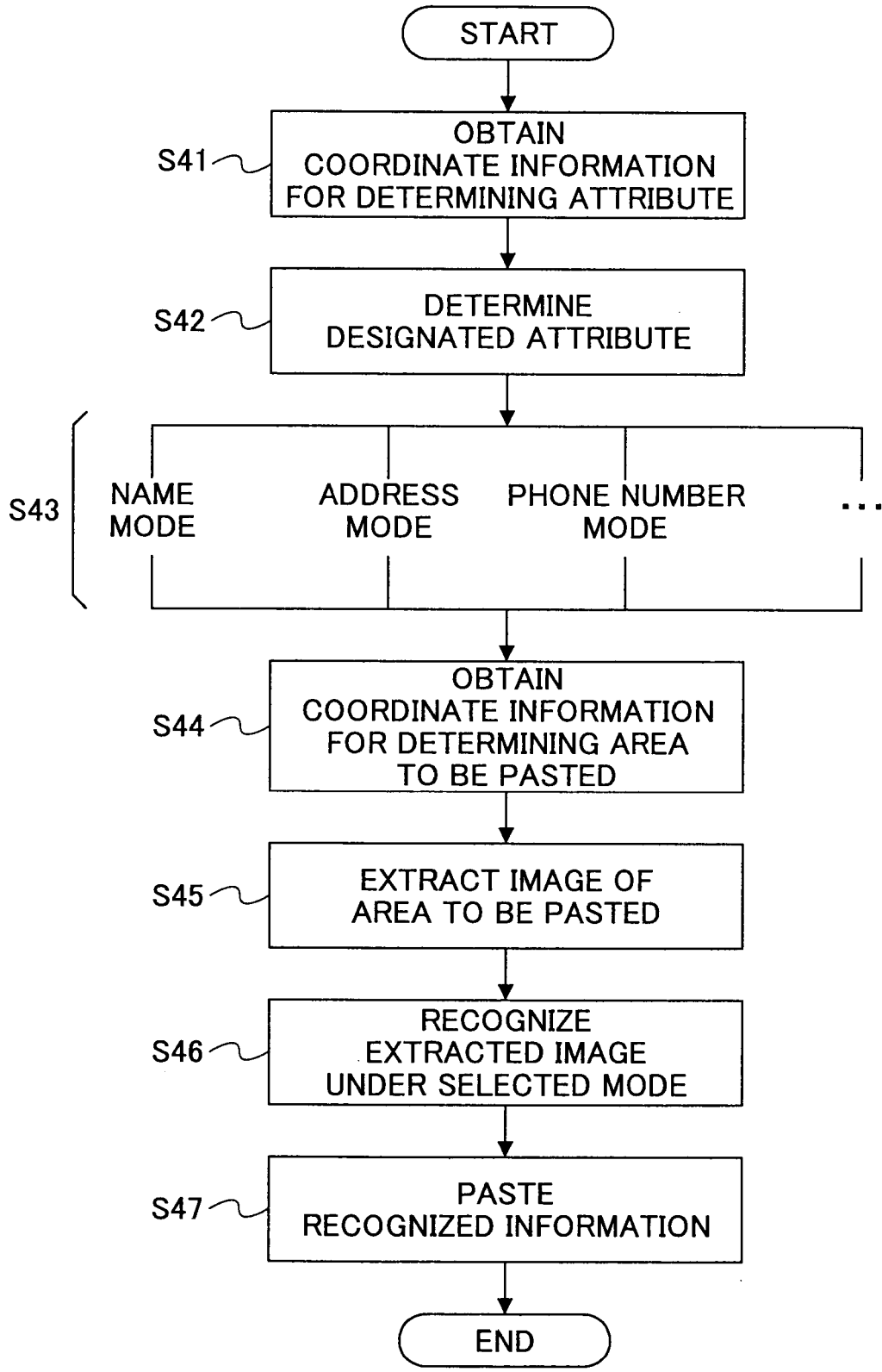
FIG. 10 is a detailed flowchart of the procedure performed by the document information input apparatus according to the first embodiment.

FIG. 10 shows a detailed flowchart of a procedure performed by the document information input apparatus according to the first embodiment.

At step S41, the document information input apparatus obtains coordinate information of the electronic pen that the user operates on the paper-based document in order to determine what attribute the user designates in the above-mentioned attribute designating area. Here, it is supposed that the user designates an area including a name character sequence.

At step S42, the document information input apparatus determines the designated attribute based on the obtained coordinate information.

At step S43, the document information input apparatus prepares a dictionary and an extraction method that are the most suitable for the designated attribute mode.

At step S44, the document information input apparatus obtains coordinate information of the electronic pen that the user operates on the paper-based document in order to determine an area to be pasted to an electronic document on the display apparatus 7.

At step S45, the document information input apparatus extracts an image of the area to be pasted based on the coordinate information obtained at step S44.

At step S46, the document information input apparatus recognizes the extracted image as text information by using a selected dictionary. The document information input apparatus uses the most suitable name dictionary and character extraction method to recognize the text information from the extracted image. As a result, it is possible to recognize the text information with high accuracy.

At step S47, the document information input apparatus pastes the recognized text information to a position, for instance, the position where a cursor is placed, of the electronic document.

In this fashion, when the user inputs a character sequence to the electronic document, the document information input apparatus detects a designated character mode such as the name mode, the address mode and the phone number mode and then prepares the most suitable dictionary and character extraction method for the designated character mode. Then, the document information input apparatus uses the dictionary and the character extraction method to recognize text information from the extracted image of the designated area. The document information input apparatus pastes the recognized text information to the corresponding position of the electronic document. Since the character recognition is performed by using the appropriate dictionary and the extraction method, it is possible to recognize the character sequence in the paper-based document with high accuracy.

A description will now be given, with reference to a flowchart in FIG. 11, of the second embodiment of the present invention wherein the document information input apparatus according to the second embodiment differs from that according to the first embodiment in a coordinate obtaining process, an image obtaining process and an attribute determining process and the description thereof will be given.

Figure 11:
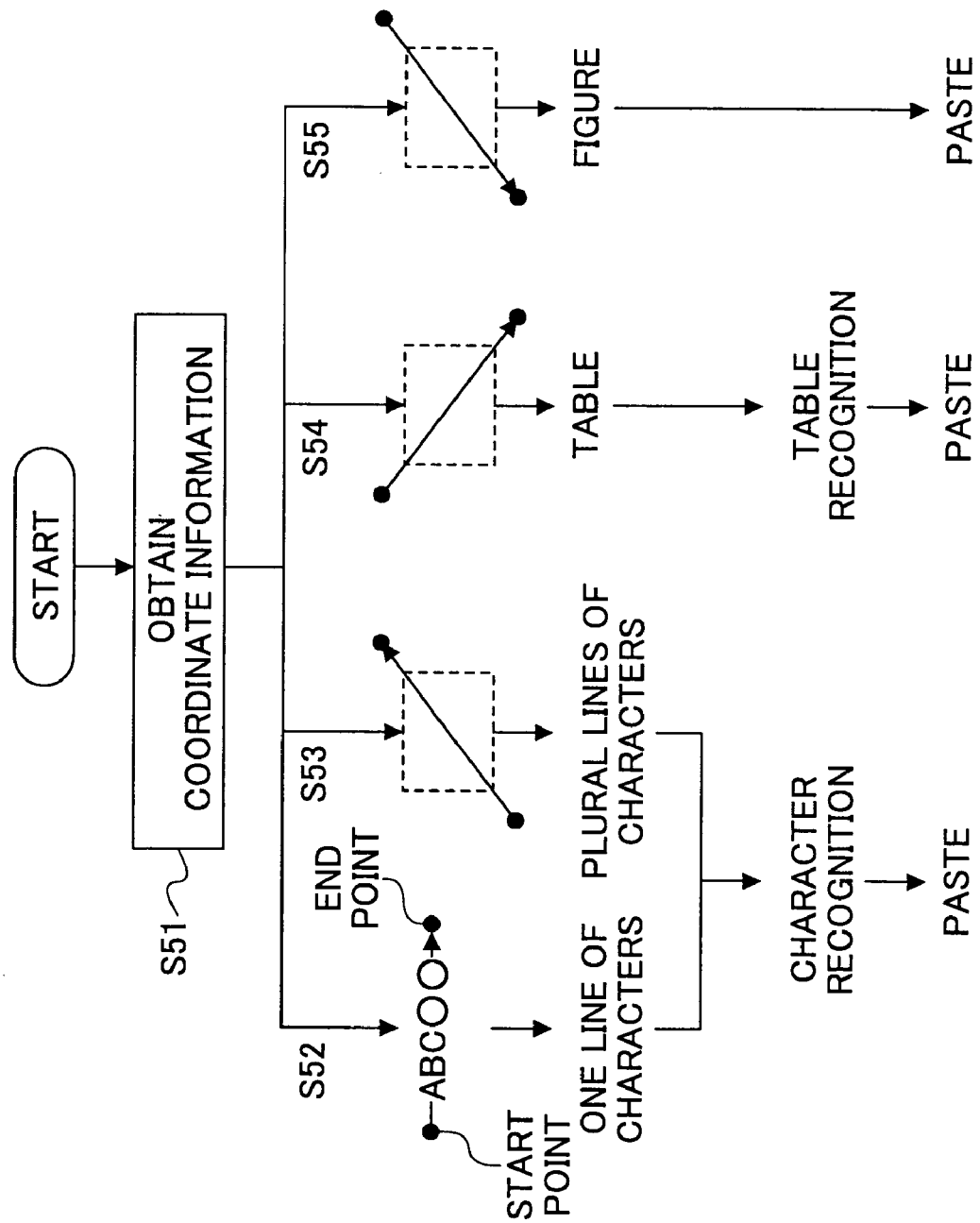
FIG. 11 is a flowchart of a coordinate obtaining process, an image obtaining process and an attribute determining process performed by a document information input apparatus according to a second embodiment.

FIG. 11 shows a flowchart of the coordinate obtaining process, the image obtaining process and the attribute determining process performed by the document information input apparatus according to the second embodiment.

At step S51, the document information input apparatus obtains coordinate information of the electronic pen that the user operates on a paper-based document.

Based on the coordinate information, if the locus of the electronic pen is an approximate right directional horizontal line as shown in FIG. 11, the document information input apparatus determines that the user designates a line of characters included between the start point and the end point at step S52. Consequently, the document information input apparatus obtains an image of the rectangular area including this line of characters and then recognizes the image as text information as mentioned above.

At step S53, if the electronic pen moves in the upper-right direction as shown in FIG. 11, the document information input apparatus determines that the user designates a plurality of lines of characters included between the start point and the end point. Consequently, the document information input apparatus obtains an image of the rectangular area including these lines of characters and then recognizes the image as text information as mentioned above.

At step S54, if the electronic pen moves in the lower-right direction as shown in FIG. 11, the document information input apparatus determines that the user designates a table located between the start point and the end point. Consequently, the document information input apparatus obtains an image of the rectangular area including the table and then recognizes the image as text information in accordance with the above-mentioned table recognition method.

At step S55, if the electronic pen moves in the lower-left direction as shown in FIG. 11, the document information input apparatus determines that the user designates a figure located between the start point and the end point. Consequently, the document information input apparatus obtains an image of the rectangular area including the figure.

In this fashion, based on the predetermined movement of the electronic pen that the user operates on a paper-based document, the document information input apparatus can determine information to be recognized in the paper-based document and the attribute thereof together. Then, the document information input apparatus can recognize an image of the information to be recognized as text information with high accuracy in accordance with the attribute mode thereof. As a result, it is possible to more quickly and conveniently input the information of the paper-based document to a designated position in an electronic document.

A description will now be given, with reference to a flowchart in FIG. 12, of a variation of the second embodiment of the present invention wherein the document information input apparatus differs from that according to the second embodiment in table recognition.

Figure 12:
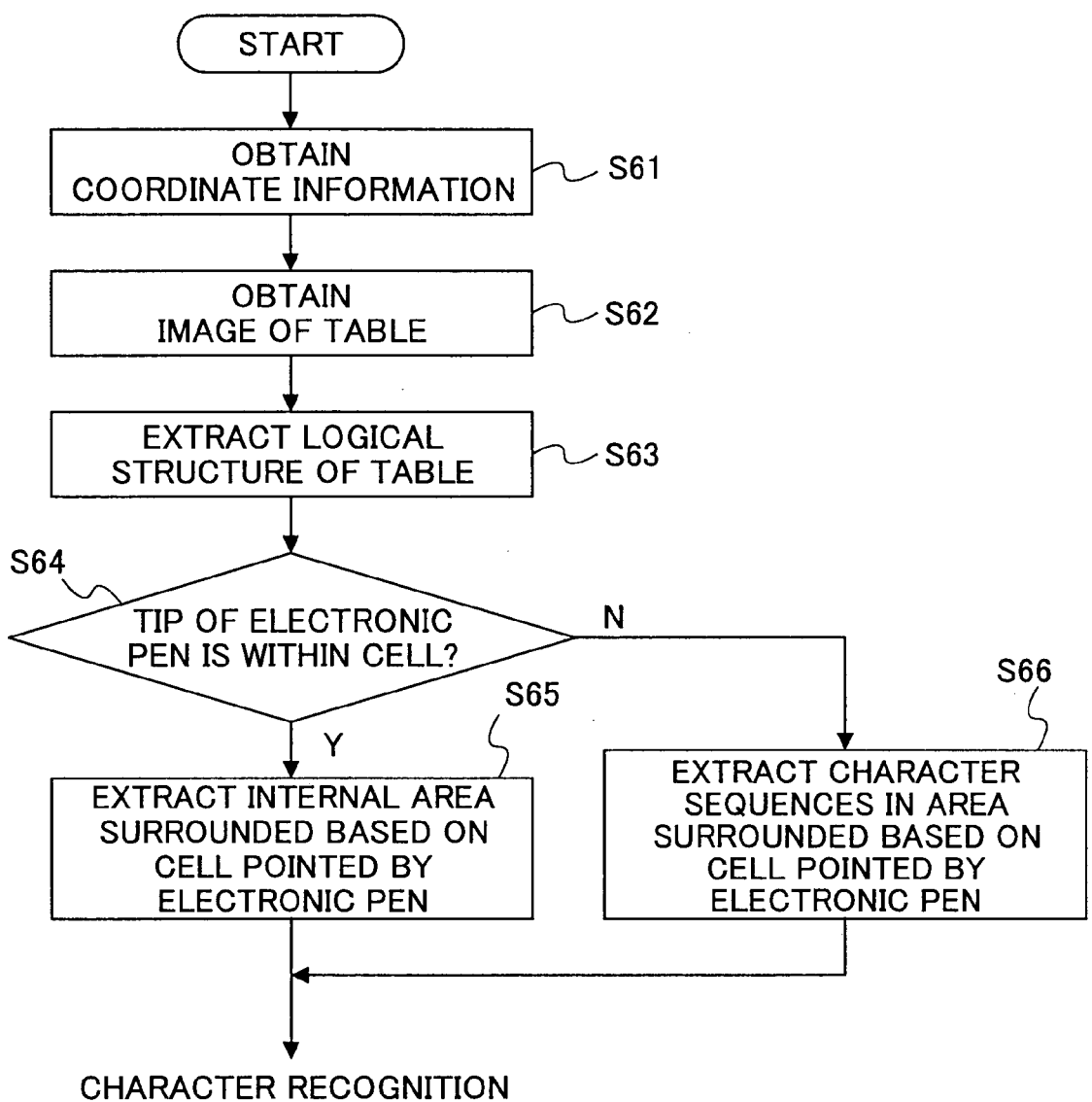
FIG. 12 is a flowchart of a procedure performed by a document information input apparatus according to a variation of the second embodiment.

FIG. 12 shows a flowchart of a procedure performed by the document information input apparatus according to the variation of the second embodiment.

At step S61, the document information input apparatus obtains coordinate information of the electronic pen like the document information input apparatus according to the second embodiment. In this description, it is supposed that the document information input apparatus detects that the user designates a table in the paper-based document.

At step S62, the document information input apparatus obtains an image of the rectangular area including the table based on the coordinate information of the electronic pen.

At step S63, the document information input apparatus extracts the logical structure of the table such as ruled lines and cells of the table from the obtained image.

At step S64, the document information input apparatus determines whether or not the tip of the electronic pen is within a cell of the table. If the tip is within a cell, the document information input apparatus extracts an internal rectangular area including the cell pointed at by the electronic pen and then recognizes text information of each cell in the internal rectangular area at step S65. In contrast, if the tip is outside the table, the document information input apparatus extracts an image of an area including a character sequence within a predetermined distance from the tip of the electronic pen. Then, the document information input apparatus recognizes the extracted image as text information.

In this fashion, the document information input apparatus can recognize not only characters in the table but also characters outside the table in the designated rectangular area together and then quickly input the recognized text information to a designated position of an electronic document.

A description will now be given, with reference to a flowchart in FIG. 13, of a document information input apparatus according to the third embodiment of the present invention wherein the document information input apparatus differs from that according to the first embodiment in an attribute determining process.

The document information input apparatus according to the first embodiment determines a designated attribute based on a click of an electronic pen on a predetermined position assigned for each attribute in advance. On the other hand, the document information input apparatus according to the third embodiment determines a designated attribute based on character recognition of each character sequence representing attribute/mode type.

Figure 13:
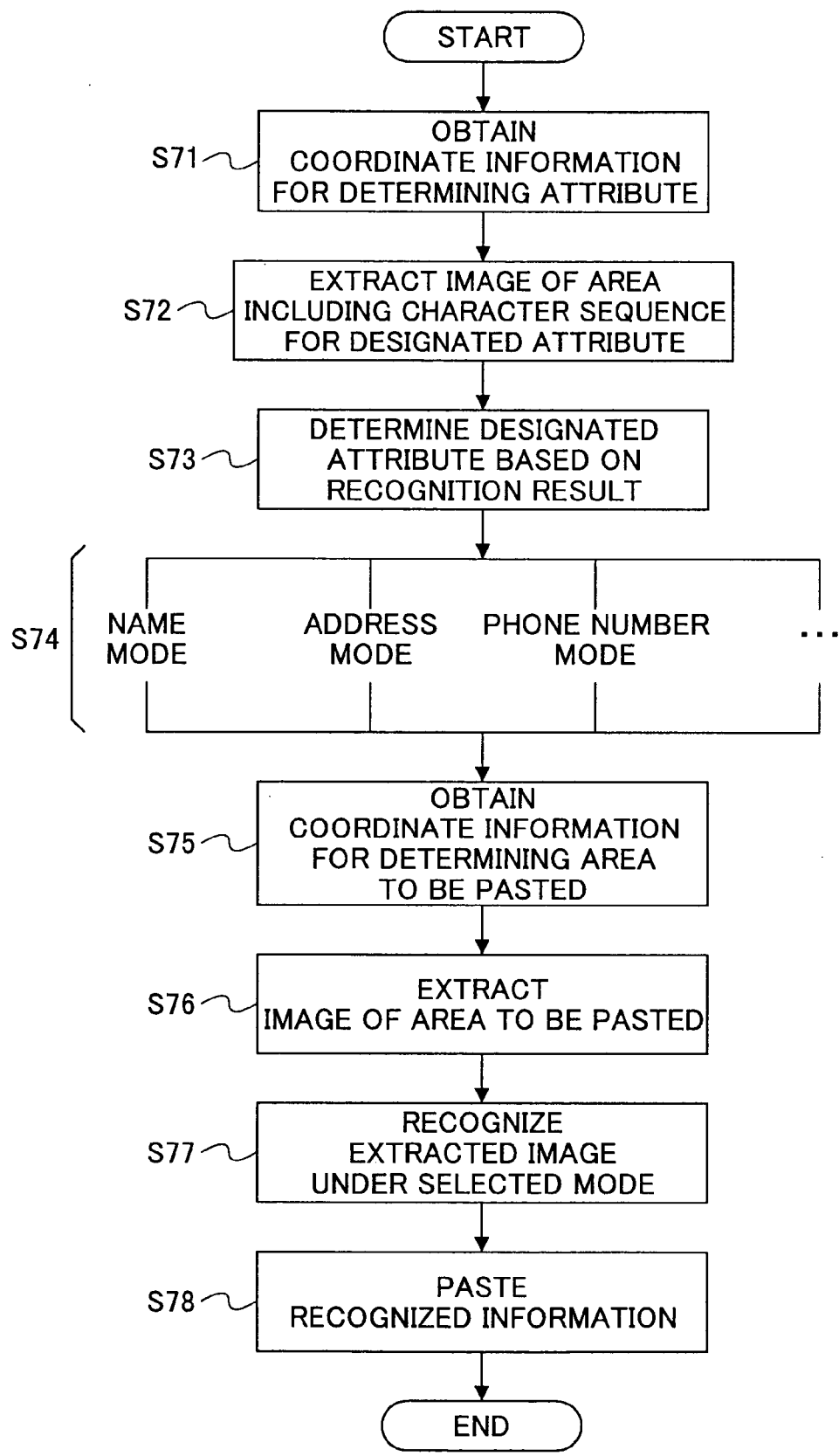
FIG. 13 is a flowchart of a procedure performed by a document information input apparatus according to a third embodiment.

FIG. 13 shows a flowchart of a procedure performed by the document information input apparatus according to the third embodiment.

At step S71, the document information input apparatus obtains coordinate information of the electronic pen that the user operates on a paper-based document in order to determine what attribute the user designates in the above-mentioned attribute designating area.

At step S72, the document information input apparatus extracts an image of an area in the attribute designating area based on the obtained coordinate information. Here, it is supposed that the user designates an area including the character sequence "name" that represents a name mode.

At step S73, the document information input apparatus recognizes the extracted image as text information. In this case, the character sequence "name" is detected from the extracted image. Based on the recognition result, the document information input apparatus determines that the user designate the name attribute based on the recognized character sequence "name".

At step S74, the document information input apparatus prepares a dictionary and an extraction method that are the most suitable for the designated attribute mode.

At step S75, the document information input apparatus obtains coordinate information of the electronic pen that the user operates on the paper-based document in order to determine an area to be pasted to an electronic document on the display apparatus 7.

At step S76, the document information input apparatus extracts an area to be pasted based on the coordinate information obtained at the step S75.

At step S77, the document information input apparatus recognizes the extracted image as text information by using a selected dictionary. The document information input apparatus uses the most suitable name dictionary and character extraction method to recognize the text information from the extracted image. As a result, it is possible to recognize the text information with high accuracy.

At step S78, the document information input apparatus 10 pastes the recognized text information to a position, for instance, the position where a cursor is placed, in the electronic document.

In this fashion, even if an area is not assigned in advance for each attribute, the document information input apparatus can determine a designated attribute by recognizing a character sequence corresponding to the attribute. Since the character recognition is performed by using the dictionary and the character extraction method based on the determined attribute, it is possible to recognize the character sequence in the paper-based document with high accuracy.

The present invention is not limited to the specifically disclosed embodiments, and variations and modifications may be without departing from the scope of the present invention.

What is claimed is:

1. A document information input apparatus for recognizing information in a real document and inputting said information recognized to a document displayed by a computer, comprising:
   a designating part designating an area to be processed in said real document and an attribute of the area, the area and the attribute specified by a user manipulating a designating device;
   a detecting part detecting said area to be processed designated by said designating part;
   a reading part reading an image of said area to be processed;
   a character recognition pad recognizing said image of the area to be processed as text information; and
   a pasting part pasting a result of said character recognition part to a pertinent position of said document displayed by the computer.

2. The document information input apparatus as claimed in claim 1, further comprising an attribute determining part determining which attribute said area to be processed has among a text attribute, a table attribute and a figure attribute when said detecting part detects said area to be processed.

3. The document information input apparatus as claimed in claim 2, wherein said attribute determining part determines said area to be processed as one of said text attribute, said table attribute and said figure attribute based on an area designated by said designating part.

4. The document information input apparatus as claimed in claim 2, wherein said attribute determining part determines said area to be processed as one of said text attribute, said table attribute and said figure attribute based on a movement of said designating part.

5. The document information input apparatus as claimed in claim 2, wherein said attribute determining part, when said attribute determining part determines said area to be processed as the text attribute, further determines a mode designated by said designating part, said mode for recognizing said area to be processed as text information.

6. The document information input apparatus as claimed in claim 2, wherein said detecting part, when said attribute determining part determines that said area to be processed has the table attribute and a position designated by said designating part is within a cell, detects an area including said cell as said area to be processed and wherein said detecting part, when said attribute determining part determines that said area to be processed has the table attribute and the position designated by said designating part is outside any cell, detects an area including a character sequence within a predetermined distance from said position as said area to be processed.

7. A document information input method for recognizing information in a real document and inputting said information recognized to a document displayed by a computer, comprising:
   designating an area to be processed in said real document and an attribute of the area, the area and the attribute specified by a user manipulating a designating device;
   detecting said area to be processed;
   reading an image of said area to be processed;
   recognizing said image of the area to be processed as text information; and
   pasting a result of said recognizing said image to a pertinent position of said document displayed by the computer.

8. The document information input method as claimed in claim 7, further comprising determining which attribute said area to be processed has among a text attribute, a table attribute and a figure attribute when said area to be processed is detected.

9. The document information input method as claimed in claim 8, wherein said area to be processed is determined to have one of said text attribute, said table attribute and said figure attribute based on an area designated.

10. The document information input method as claimed in claim 8, wherein said area to be processed is determined to have one of said text attribute, said table attribute and said figure attribute based on how said area to be processed is designated.

11. The document information input method as claimed in claim 8, wherein said area to be processed, when said area to be processed is determined as the text attribute, is further determined to have a mode designated, said mode for recognizing said area to be processed as text information.

12. The document information input method as claimed in claim 8, wherein said area to be processed, when said area to be processed is determined to have the table attribute and a position designated is within a cell, is detected from an area including said cell and wherein said area to be processed, when said area to be processed is determined to have the table attribute and the position designated is outside any cell, is detected from an area including a character sequence within a predetermined distance from said position.

13. A computer-readable medium storing a document information input program for recognizing information in a real document and inputting said information recognized to a document displayed by a computer, the program causing the computer to execute:
   designating an area to be processed in said real document and an attribute of the area, the area and the attribute specified by a user manipulating a designating device;
   detecting said area to be processed;
   reading an image of said area to be processed;
   recognizing said image of the area to be processed as text information; and
   pasting a result of said recognizing said image to a pertinent position of said document displayed by the computer.

14. The computer-readable medium storing as claimed in claim 13, the program further causing the computer to execute determining which attribute said area to be processed has among a text attribute, a table attribute and a figure attribute when said area to be processed is detected.

15. The computer-readable medium storing as claimed in claim 14, wherein said area to be processed is determined to have one of said text attribute, said table attribute and said figure attribute based on an area designated.

16. The computer-readable medium storing as claimed in claim 14, wherein said area to be processed is determined to have one of said text attribute, said table attribute and said figure attribute based on how said area to be processed is designated.

17. The computer-readable medium storing as claimed in claim 14, wherein said area to be processed, when said area to be processed is determined as the text attribute, is further determined to have a mode designated, said mode for recognizing said area to be processed as text information.

18. The computer-readable medium storing as claimed in claim 14, wherein said area to be processed, when said area to be processed is determined to have the table attribute and a position designated is within a cell, is detected from an area including said cell and wherein said area to be processed, when said area to be processed is determined to have the table attribute and the position designated is outside any cell, is detected from an area including a character sequence within a predetermined distance from said position.

19. A document information input apparatus for recognizing information in a real document and inputting said information recognized to a document displayed by a computer, comprising:
- a controller to control the computer according to a process comprising:
  - designating an area to be processed in said real document and an attribute of the area, the area and the attribute specified by a user manipulating a designating device;
  - detecting said area to be processed;
  - reading an image of said area to be processed;
  - recognizing said image of the area to be processed as text information; and
  - pasting a result of said step of recognizing said image to a pertinent position of said document displayed by the computer.

20. A computer readable recording medium for recording a document information input program for recognizing information in a real document and inputting said information recognized to a document displayed by a computer, the program causing the computer to execute:
- designating an area to be processed in said real document and an attribute of the area, the area and the attribute specified by a user manipulating a designating device;
- determining which attribute said area to be processed has among a text attribute, a table attribute and a figure attribute;
- detecting said area to be processed;
- reading an image of said area to be processed;
- recognizing said image of the area to be processed as text information; and
- pasting a result of said recognizing said image to a pertinent position of said document displayed by the computer.

* * * * *

UNITED STATES PATENT AND TRADEMARK OFFICE
CERTIFICATE OF CORRECTION

| | |
|---|---|
| PATENT NO. | : 7,280,693 B2 |
| APPLICATION NO. | : 10/602624 |
| DATED | : October 9, 2007 |
| INVENTOR(S) | : Koji Kurokawa et al. |

It is certified that error appears in the above-identified patent and that said Letters Patent is hereby corrected as shown below:

Column 13, Line 33, change "pad" to --part--.

Signed and Sealed this

Eighth Day of April, 2008

JON W. DUDAS
*Director of the United States Patent and Trademark Office*